(12) United States Patent
Akiyama

(10) Patent No.: US 9,139,174 B2
(45) Date of Patent: Sep. 22, 2015

(54) VEHICULAR DRIVING SUPPORT SYSTEM

(75) Inventor: Tomonori Akiyama, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/346,799

(22) PCT Filed: Sep. 26, 2011

(86) PCT No.: PCT/JP2011/071893
§ 371 (c)(1),
(2), (4) Date: Jul. 7, 2014

(87) PCT Pub. No.: WO2013/046300
PCT Pub. Date: Apr. 4, 2013

(65) Prior Publication Data
US 2014/0316668 A1    Oct. 23, 2014

(51) Int. Cl.
*G08G 1/16* (2006.01)
*B60T 8/1755* (2006.01)
*B60W 10/184* (2012.01)
*B60W 30/09* (2012.01)
*B60W 30/095* (2012.01)
*B60W 10/18* (2012.01)
*B60W 10/20* (2006.01)
*B60W 30/02* (2012.01)
*B60W 50/00* (2006.01)

(52) U.S. Cl.
CPC ............ *B60T 8/17558* (2013.01); *B60W 10/18* (2013.01); *B60W 10/184* (2013.01); *B60W 10/20* (2013.01); *B60W 30/09* (2013.01); *B60W 30/095* (2013.01); *B60W 30/02* (2013.01); *B60W 2050/0094* (2013.01); *B60W 2520/10* (2013.01); *B60W 2540/18* (2013.01); *B60W 2710/182* (2013.01); *B60W 2710/207* (2013.01)

(58) Field of Classification Search
CPC ... B60W 10/18; B60W 10/184; B60W 10/20; B60W 30/09; B60W 30/095; B60W 30/02; B60W 2520/10; B60W 2710/207; B60W 2710/182; B60W 2050/0094; B60W 2540/18; B60T 8/17558
See application file for complete search history.

(56) References Cited

U.S. PATENT DOCUMENTS

| | | | |
|---|---|---|---|
| 5,485,892 A | 1/1996 | Fujita | |
| 7,647,178 B2 * | 1/2010 | Ekmark et al. | 701/301 |
| 7,729,841 B2 * | 6/2010 | Knoop et al. | 701/80 |
| 2001/0020217 A1 | 9/2001 | Matsuno | |
| 2006/0282218 A1 * | 12/2006 | Urai et al. | 701/301 |

(Continued)

FOREIGN PATENT DOCUMENTS

| | | |
|---|---|---|
| JP | 3197307 B | 8/2001 |
| JP | 2001-247023 A | 9/2001 |

(Continued)

*Primary Examiner* — Michael J Zanelli
(74) *Attorney, Agent, or Firm* — Kenyon & Kenyon LLP

(57) ABSTRACT

According to the invention, in a system that provides driving support for a vehicle, if a solid body is recognized in an advancing direction of a host vehicle, at least one avoidance target trajectory that allows a collision of the host vehicle with the solid body to be avoided are acquired on the basis of a traveling state of the host vehicle. Then, if the acquired avoidance target trajectories exist in both right and left sides of the host vehicle across the solid body, the control regarding the braking of the host vehicle is performed without performing the control regarding the turning of the host vehicle.

6 Claims, 8 Drawing Sheets

(56) References Cited

U.S. PATENT DOCUMENTS

2007/0299610 A1* 12/2007 Ewerhart et al. ............ 701/301
2008/0319610 A1* 12/2008 Oechsle et al. ............. 701/41
2011/0106361 A1* 5/2011 Staempfle et al. ........... 701/23

FOREIGN PATENT DOCUMENTS

| | | |
|---|---|---|
| JP | 2010-274880 A | 12/2010 |
| WO | 2010048611 A1 | 4/2010 |

* cited by examiner

VEHICULAR DRIVING SUPPORT SYSTEM

CROSS-REFERENCE TO RELATED APPLICATIONS

This is a national phase application based on the PCT International Patent Application No. PCT/JP2011/071893 filed on Sep. 26, 2011, the entire contents of which are incorporated herein by reference.

TECHNICAL FIELD

The invention relates to a driving support technology for a host vehicle such as the avoidance of a collision and the like.

BACKGROUND ART

Conventionally, there has been developed a technology of detecting a solid body that exists in front of a host vehicle and electrically operating a brake to avoid a collision with the solid body through a braking force of the brake if the host vehicle is estimated to collide with the detected solid body. However, the avoidance of a collision through the braking force alone leads to the dispersion of the braking force that is generated in accordance with the condition of a traveling road surface and the state of tires, and also constitutes a factor that causes sudden braking. Therefore, there has been developed a technology of performing an avoidance operation through turning if a collision cannot be sufficiently avoided through a braking force (e.g., see Patent Document 1).

RELATED ART DOCUMENT

Patent Document

Patent Document 1: Japanese Patent Application Publication No. 2001-247023 (JP-2001-247023 A)

SUMMARY OF THE INVENTION

Problem to be Solved by the Invention

By the way, if there are a plurality of trajectories that can be adopted to avoid a collision with a solid body in the case where the solid body exists in an advancing direction of a vehicle, especially if there are trajectories for avoidance on right and left sides of the solid body in a right-to-left direction of the vehicle respectively, a turning direction that is automatically determined by a system as in the case of the aforementioned turning control and a turning direction that is recognized by a driver may be different from each other. As a result, the driver feels that the vehicle turns reversely to the turning direction recognized by himself or herself. Therefore, driving support unsuited for the feeling of the driver is provided.

The invention has been made in view of the aforementioned various circumstances. It is an object of the invention to provide a driving support technology suited for the feeling of a driver in a system that provides driving support such as the avoidance of a collision of a vehicle and the like.

Means for Solving the Problem

In order to solve the aforementioned problem, the invention is configured such that a trajectory for avoiding a collision with a solid body is acquired if the solid body is recognized in an advancing direction of a host vehicle, and that control regarding the turning of the host vehicle and control regarding the braking of the host vehicle are appropriately and selectively performed in accordance with a positional relationship of the trajectory relative to the solid body, in a system that supports the avoidance of a collision of a vehicle. That is, the invention is premised on that support control unsuited for the feeling of the driver as described above is brought about if there arises a discrepancy between a turning direction controlled by the system and a turning direction matching the feeling of the driver.

More specifically, a vehicular driving support system according to the invention is equipped with a recognition unit that recognizes a solid body that exists in an advancing direction of a host vehicle, an acquisition unit that acquires at least one avoidance target trajectory that allows a collision of the host vehicle with the solid body to be avoided, on the basis of a traveling state of the host vehicle, if the recognition unit recognizes an existence of the solid body, and a support control unit that performs support control for avoiding a collision of the host vehicle with the solid body on the basis of the avoidance target trajectory or avoidance target trajectory acquired by the acquisition unit. In addition, the support control unit is configured to perform control regarding braking of the host vehicle without performing control regarding turning of the host vehicle if the avoidance target trajectories acquired by the acquisition unit exist on right and left sides of the solid body in a right-to-left direction of the host vehicle.

In the driving support system according to the invention, if the recognition unit recognizes the existence of the solid body in the advancing direction of the host vehicle, the acquisition unit acquires the at least one avoidance target trajectory. These avoidance target trajectories are trajectories for the traveling of the vehicle that can be adopted in order for the vehicle to avoid the recognized solid body, and are acquired on the basis of the traveling state of the host vehicle. As this traveling state, it is possible to exemplify a vehicle speed of the host vehicle, a lateral acceleration of the host vehicle, and the like. It should be noted herein that no specific condition is imposed on the contents of the control regarding the turning of the host vehicle and the control regarding the braking of the host vehicle, which are performed to realize traveling on the trajectories, as to the acquisition of the avoidance target trajectories. On the other hand, however, in the case where the behavior of the host vehicle during turning or during deceleration through braking is desired to be controlled to a predetermined state in accordance with a predetermined object etc., the avoidance target trajectories may be acquired on the premise that a condition corresponding to the object is imposed on the control regarding the turning of the host vehicle and the control regarding the braking of the host vehicle.

Besides, the avoidance target trajectories acquired by the acquisition unit may not necessarily be linear trajectories, but may be band-shaped trajectories that can be grasped as regions where a collision of the host vehicle with the solid body can be avoided through the turning of the host vehicle, or may assume the forms of regions and the like where the host vehicle does not interfere with the solid body. Accordingly, in the case where the acquisition unit acquires the avoidance target trajectories, at least one avoidance target trajectory having a spacing distance for the avoidance of a collision with respect to the solid body exists either on the right of the solid body or on the left of the solid body, or in each of both right and left sides of the solid body.

In addition, in the driving support system according to the invention, the support control unit performs support control for avoiding a collision as to the turning of the host vehicle and the braking of the host vehicle, on the basis of the avoidance target trajectories acquired as described above. It should be noted herein that in the case where the avoidance target trajectories exist on the right and left sides of the solid body in the right-to-left direction of the host vehicle, namely, in the case where a trajectory on which the host vehicle travels on the right side of the solid body through turning and a trajectory on which the host vehicle travels on the left side of the solid body through turning are included in the acquired avoidance target trajectories in order to avoid a collision of the host vehicle with the solid body, a collision with the solid body can be avoided regardless of which one of the trajectories is adopted. In the case where the driving support system adopts the trajectory on one side of the solid body and attempts to perform turning control, and on the other hand, the driver of the host vehicle adopts the trajectory on the other side and attempts to make a turn through the driver's own maneuvering, the control by the system and the maneuvering by the driver interfere with each other. As a result, driving support control unsuited for the feeling of the driver is performed.

Then, in the invention, first of all, in the case where the avoidance target trajectories exist on the right and left sides of the solid body in the right-to-left direction of the host vehicle, the support control unit performs the control regarding the braking of the host vehicle without performing the control regarding the turning of the host vehicle. Thus, a collision with the solid body is avoided at least independently of the control regarding the turning of the host vehicle. Therefore, an inconvenience in terms of support control, which results from a difference in the turning direction for avoiding a collision, as described above can be avoided. Incidentally, if the driver steers when the support control unit performs the control regarding the braking, the advancing direction of the vehicle is changed in accordance with the steering, and the solid body can be avoided. If the driver does not steer, the host vehicle is decelerated as a result of the control regarding the braking by the support control unit and can be stopped in front of the solid body before a collision, or the vehicle speed in the event of a collision with the solid body can be reduced.

It should be noted herein that in the aforementioned driving support system, if the avoidance target trajectory acquired by the acquisition unit exist on one of the right and left sides of the solid body in the right-to-left direction of the host vehicle, the support control unit may be permitted to perform the control regarding the turning of the host vehicle, and the amount of turning of the host vehicle by the support control unit may be limited so as not to exceed a predetermined turning amount that is set on the basis of a turning amount that can be produced through the driver's steering. If the avoidance target trajectory exists on one of the right and left sides of the solid body in the right-to-left direction of the host vehicle, the turning orientation that should be adopted to avoid a collision is limited. In other words, the turning toward that one direction which allows a collision to be avoided is demanded as a matter of course. Thus, under such a condition, even if the support control unit is permitted to perform the control regarding the turning of the host vehicle, it does not turn out that the control by the system and the maneuvering by the driver interfere with each other, and hence, the performance of driving support control unsuited for the feeling of the driver can be avoided.

Incidentally, in this case, the amount of turning of the host vehicle by the support control unit is limited so as not to exceed the predetermined turning amount that is set on the basis of the turning amount that can be produced through the driver's steering. The amount of turning by the support control unit is limited so as not to exceed the predetermined turning amount, whereby if the driver steers on his or her own judgment when the support control unit performs driving support control, the turning amount that is produced through the steering exceeds the amount of turning through support control. Therefore, the host vehicle eventually exhibits a behavior with priority given to the driver's steering. In this manner, the support control unit performs turning control such that the turning of the host vehicle by the driver can override the turning by the system, whereby driving support control suited for the feeling of the driver can be realized. Incidentally, as the turning amount, an arbitrary parameter (e.g., a yaw rate, a lateral acceleration or the like) that is produced during the turning of the host vehicle and associated with the turning can be utilized.

It should be noted herein that the aforementioned driving support system may further be equipped with a determination unit that determines whether or not a collision with the solid body can be avoided in a limited state where the amount of turning of the host vehicle by the support control unit is limited so as not to exceed the predetermined turning amount. In addition, if the determination unit determines that a collision of the host vehicle with the solid body cannot be avoided, the support control unit determines whether or not the control regarding the turning of the host vehicle by the support control unit is permitted, on the basis of a virtual collision speed of the host vehicle in a case where the host vehicle collides with the solid body while the support control unit performs the control regarding turning and the control regarding braking, under the limited state.

The determination that is made by the aforementioned determination unit is a determination on the possibility of avoiding a collision on the premise of a state where the amount of turning of the host vehicle by the support control unit is limited, namely, with a room of driving support control suited for the feeling of the driver secured. It should be noted herein that the virtual collision speed is a vehicle speed in a case where the host vehicle is assumed to collide with the solid body even while turning control for the avoidance of a collision and braking control for deceleration are performed for the host vehicle under the aforementioned limited state. It is preferable for safety reasons that the vehicle speed in the event of a collision be made as low as possible through deceleration in a process of making the time until the collision with the solid body as long as possible through turning even though the process is carried out. On the other hand, the generation of a lateral force is required in order for the host vehicle to turn. Therefore, the braking force for decelerating the vehicle through turning physically decreases. Accordingly, from the standpoint of reducing the vehicle speed in the event of a collision, it is preferable to determine whether or not the support control unit is permitted to perform the control regarding the turning of the host vehicle, for the turning of the host vehicle, on the basis of a criterion on the degree to which the virtual collision speed can be reduced.

As an example of the control regarding the turning, the support control unit first calculates a second virtual collision speed in a case where the host vehicle collides with the solid body while being controlled such that a maximum braking force is generated as to the braking of the host vehicle, with the control regarding the turning not performed for the host vehicle by the support control unit. The aforementioned second virtual collision speed is a vehicle speed in a case where the host vehicle is decelerated with a frictional force utilized to the utmost as a braking force without being turned with respect to the solid body. In addition, if the virtual collision speed is lower than the second virtual collision speed as a result of a comparison between the virtual collision speed and the second virtual collision speed, the control regarding the braking of the host vehicle as well as the control regarding the turning of the host vehicle may be performed. Thus, even if a collision of the host vehicle with the solid body cannot be avoided, the speed of the host vehicle in the event of a collision can be made as low as possible by combining turning with deceleration through braking.

On the other hand, if the virtual collision speed is not lower than the second virtual collision speed as a result of a comparison between the virtual collision speed and the second virtual collision speed, only the control regarding the braking of the host vehicle may be performed without performing the control about the turning of the host vehicle. Thus, part of a frictional force is utilized to the utmost as a braking force for deceleration without being utilized as a lateral force for turning. Even though a collision of the host vehicle with the solid body cannot be avoided, the speed of the host vehicle in the event of a collision can be made as low as possible.

Incidentally, in the case where the aforementioned driving support system is further equipped with the determination unit that determines whether or not a collision of the host vehicle with the solid body can be avoided in a limited state where the amount of turning of the host vehicle by the support control unit is limited so as not to exceed the predetermined turning amount, if the determination unit determines that a collision of the host vehicle with the solid body can be avoided, the support control unit may perform the control regarding the braking of the host vehicle as well as the control regarding the turning of the host vehicle. That is, if it is determined that a collision with the solid body can be avoided, the control regarding the turning of the host vehicle and the control regarding the braking of the host vehicle are performed. Thus, a frictional force is appropriately distributed to a lateral force for turning and a braking force for deceleration, and the avoidance of a collision is realized.

Effect of the Invention

The invention makes it possible to provide a driving support technology suited for the feeling of a driver in a system that provides driving support such as the avoidance of a collision of a vehicle and the like.

MODES FOR CARRYING OUT THE INVENTION

The concrete embodiments of the invention will be described hereinafter on the basis of the drawings. In this case, an example in which the invention is applied to a system that makes a determination on a traveling road of a host vehicle or a solid body as an obstacle, and provides driving support for avoiding a deviation from the traveling road on which the determination is made or a collision with the solid body on which the determination is made, or mitigating a damage caused in the event of a collision will be described. Besides, each of the configurations described in the following embodiments of the invention indicates one mode of carrying out the invention, and does not limit the configuration of the invention.

⟨First Embodiment⟩

Figure 1:
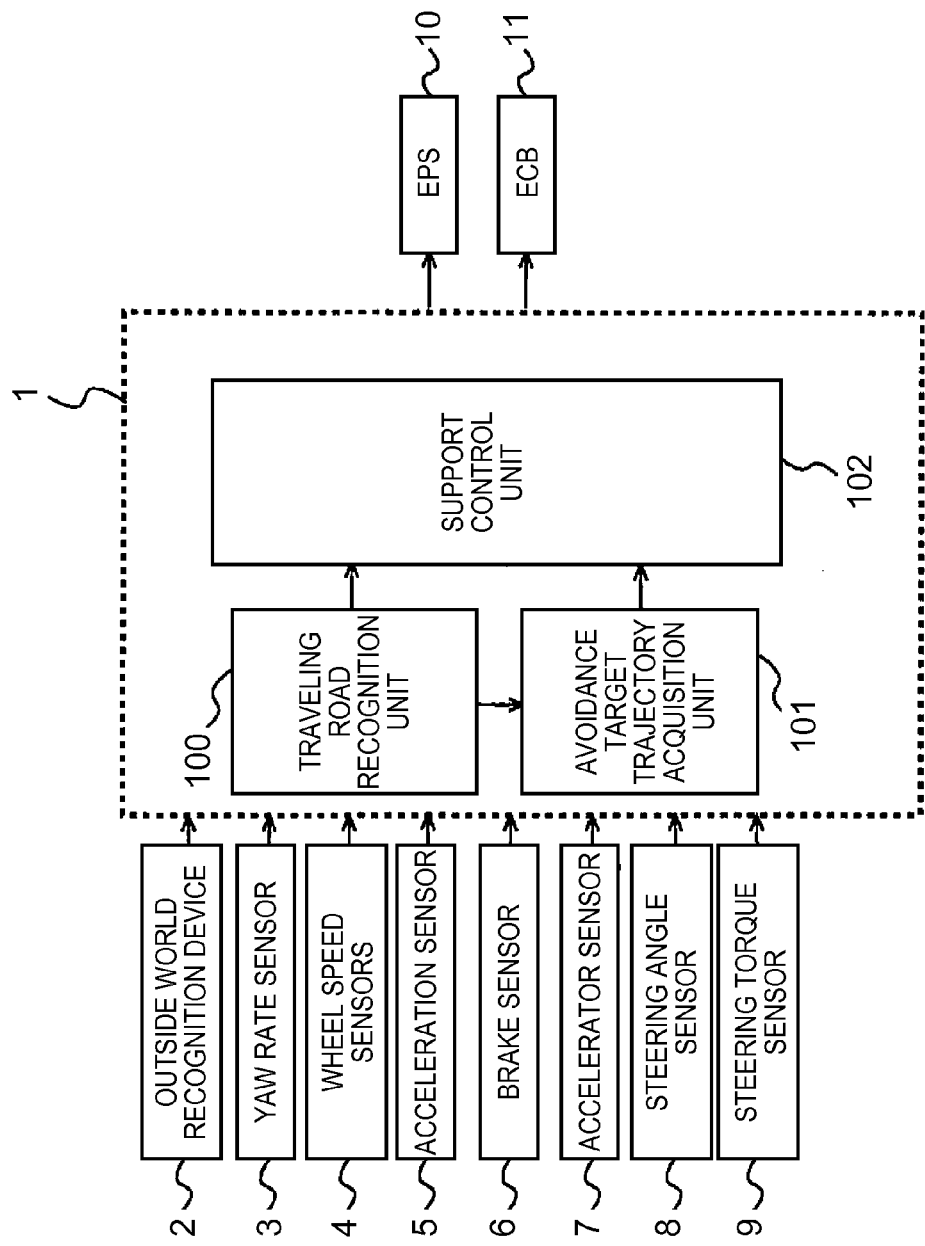
FIG. 1 is a view showing the configuration of a vehicular driving support system according to the invention.

First of all, the first embodiment of the invention will be described. FIG. 1 is a block diagram functionally showing the configuration of a vehicular driving support system according to the invention. As shown in FIG. 1, a vehicle is mounted with a control unit (an ECU) 1 for driving support.

The ECU 1 is an electronic control unit that is equipped with a CPU, a ROM, a RAM, a backup RAM, an I/O interface and the like. Various sensors such as an outside world recognition device 2, a yaw rate sensor 3, wheel speed sensors 4, an acceleration sensor 5, a brake sensor 6, an accelerator sensor 7, a steering angle sensor 8, a steering torque sensor 9 and the like are electrically connected to the ECU 1, and output signals of those sensors are input to the ECU 1.

The outside world recognition device 2 includes, for example, at least one of measuring devices such as a laser imaging detection and ranging unit (an LIDAR), a laser range finder (an LRF), a millimeter-wave radar, a stereo camera and the like, and detects information on a position of a host vehicle 20 relative to a solid body 30 that exists around the vehicle (e.g., a relative distance and a relative angle). Incidentally, detection of information on the solid body 30 by the outside world recognition device 2 is widely disclosed in the conventional art, and hence the details thereof are omitted in the present specification. The yaw rate sensor 3 is fitted to, for example, a vehicle body of the host vehicle 20, and outputs an electric signal that is correlated with a yaw rate that acts on the host vehicle 20. The wheel speed sensors 4 are sensors that are fitted to wheels of the host vehicle 20 respectively and output electric signals that are correlated with a traveling speed (a vehicle speed) of the vehicle respectively. The acceleration sensor 5 outputs an electric signal that is correlated with an acceleration (a longitudinal acceleration) that acts in a longitudinal direction of the host vehicle 20 and an acceleration (a lateral acceleration) that acts in a lateral direction of the host vehicle 20. The brake sensor 6 is fitted to, for example, a brake pedal in a vehicle interior, and outputs an electric signal that is correlated with an operation torque (a depression force) of the brake pedal. The accelerator sensor 7 is fitted to, for example, an accelerator pedal in the vehicle interior, and outputs an electric signal that is correlated with an operation torque (a depression force) of the accelerator pedal. The steering angle sensor 8 is fitted to, for example, a steering rod that is connected to a steering wheel in the vehicle interior, and outputs an electric signal that is correlated with a rotational angle (a rotational angle) from a neutral position of the steering wheel. The steering torque sensor 9 is fitted to a steering rod, and outputs an electric signal that is correlated with a torque (a steering torque) that is input to the steering wheel.

Besides, various instruments such as an electric power steering (an EPS) 10, an electronically controlled brake (an ECB) 11 and the like are connected to the ECU 1. The EPS 10 is a device that assists a steering torque of the steering wheel with the aid of a torque that is generated by an electric motor. The ECB 11 is a device that electrically adjusts a hydraulic oil pressure (a brake hydraulic pressure) of a frictional brake that is provided in each of the wheels.

In the driving support system shown in FIG. 1, which is thus configured, the ECU 1 electrically controls the EPS 10 and the ECB 11 on the basis of information from the aforementioned various sensors and the like that are connected to the ECU 1, thereby realizing support control for the avoidance of a collision and the like. In other words, with a view to controlling various instruments for the avoidance of a collision and the like with the aid of output signals of the aforementioned various sensors, the ECU 1 has functions according to functional blocks shown in FIG. 1. That is, the ECU 1 is equipped with a traveling road recognition unit 100, an avoidance target trajectory acquisition unit 101, and a support control unit 102.

The traveling road recognition unit 100 generates information on a road (a traveling road) on which the host vehicle 20 is to travel, on the basis of information output from the outside world recognition device 2. For example, the traveling road recognition unit 100 generates information on position coordinates of indices indicating solid bodies 30 that can be obstacles for the host vehicle 20 and lane borders (e.g., road indications such as white lines, yellow lines and the like, which indicate lane borders, curbstones that extend beside the lanes, guardrails, grooves, walls, the solid bodies 30 such as poles and the like, etc.) and the posture of the host vehicle 20 with respect to those solid bodies 30 and the lane borders (a distance, a yaw angle, and the like), in a coordinate system having an origin at which the host vehicle 20 is located. Incidentally, the traveling road recognition unit 100 is equivalent to the recognition unit according to the invention.

Figure 2:
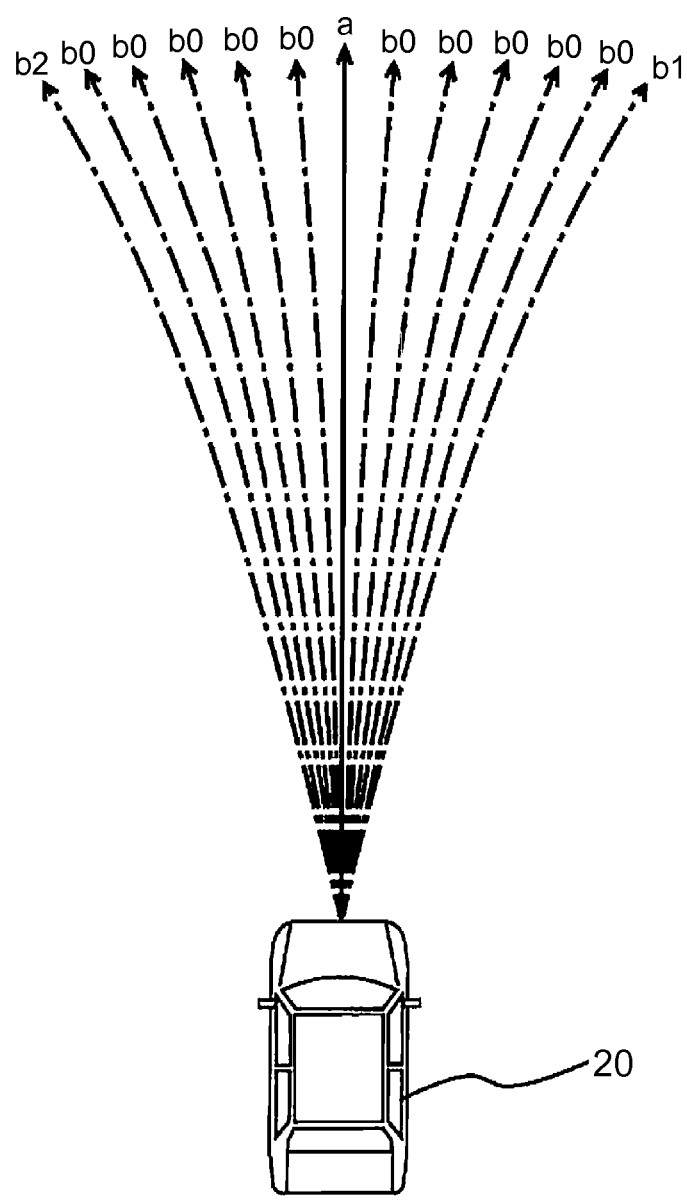
FIG. 2 is a view showing a traveling range of a traveling vehicle.

The avoidance target trajectory acquisition unit 101 is equivalent to the acquisition unit according to the invention, and acquires an avoidance target trajectory that can be adopted by the host vehicle 20 to avoid a collision with the solid body 30 that is recognized by the traveling road recognition unit 100 in a coordinate system that is generated by the traveling road recognition unit 100. This avoidance target trajectory is a trajectory that is acquired on the basis of a traveling state of the host vehicle 20, for example, a vehicle speed of the host vehicle 20, a lateral acceleration of the host vehicle 20 and the like. Specifically, as shown in FIG. 2, the avoidance target trajectory acquisition unit 101 acquires a current lateral acceleration Gy0 of the host vehicle 20 from an output signal of the acceleration sensor 5, and specifies a route a that is supposed to be followed by the host vehicle 20 if the host vehicle 20 is assumed to travel while maintaining the current lateral acceleration Gy0. Subsequently, the avoidance target trajectory acquisition unit 101 specifies a route b1 that is estimated to be followed by the host vehicle 20 in the case where a maximum change ΔGy in the lateral force for allowing the host vehicle 20 to make a safe turn at the current speed of the host vehicle 20 to the current lateral acceleration Gy0 of the host vehicle 20, and specifies a route b2 that is estimated to be followed by the host vehicle 20 in the case where the maximum change ΔGy is subtracted from the current lateral acceleration Gy0 of the host vehicle 20 on the contrary. The maximum change ΔGy may be appropriately set in consideration of factors related to safe traveling of the host vehicle, such as the structure of the host vehicle, the driver's steering and the like.

As for the specification of the routes b1 and b2, more specifically, the avoidance target trajectory acquisition unit 101 may calculate a turning radius R of the host vehicle 20 from a value obtained by adding the maximum change ΔGy to the current lateral acceleration Gy0 or subtracting the maximum change ΔGy from the current lateral acceleration Gy0, and specify the routes b1 and b2 on the basis of the calculated turning radius R. Incidentally, the turning radius R can be obtained by dividing the vehicle speed V by the yaw rate γ (R=V/γ), and the yaw rate γ can be obtained by dividing the lateral acceleration Gy by the vehicle speed V (γ=Gy/V). As a matter of course, a value detected by the yaw rate sensor 3 may be utilized as the yaw rate γ. After that, the avoidance target trajectory unit 101 specifies routes b0 in the case where the lateral acceleration is changed stepwise by a certain amount in a range (a traveling range) from the foregoing route b1 to the foregoing route b2. Incidentally, the variation width of the certain amount of this lateral acceleration may be appropriately set. Then, a trajectory that allows the host vehicle 20 to avoid colliding with the solid body 30 without interfering therewith through turning is specified as an avoidance target trajectory, on the basis of the degree of interference between the solid body 30 that exists in the advancing direction of the host vehicle 20 and the routes b1 and b2 and the plurality of the routes b0 that are set therebetween.

Subsequently, the support control unit 102 is equivalent to the support control unit according to the invention, and performs driving support control for avoiding a collision with the solid body 30 and mitigating an impact/a damage in the event of a collision via the EPS 10, the ECB 11 and the like, on the basis of the information generated by the traveling road recognition unit 100 and the avoidance target trajectory acquired by the avoidance target trajectory acquisition unit 101. Specifically, the support control unit 102 calculates controlled variables of the EPS 10 and the ECB 11, and operates the EPS 10 and the ECB 11 in accordance with the calculated controlled variables. For example, the support control unit 102 calculates a target yaw rate that is needed to avoid a collision of the host vehicle 20 with the solid body 30, and determines the controlled variable (a steering torque) of the EPS 10 and the controlled variable (a brake hydraulic pressure) of the ECB 11 such that an actual yaw rate of the host vehicle 20 (an output signal of the yaw rate sensor 3) coincides with the target yaw rate. In this case, a relationship between the target yaw rate and the steering torque, and a relationship between the target yaw rate and the brake hydraulic pressure may be mapped in advance.

Incidentally, the method of decelerating the vehicle is not limited to the method of operating the frictional brake by the ECB 11. A method of converting (regenerating) kinetic energy of the vehicle into electric energy, or a method of changing the speed ratio of a transmission to cause an increase in engine brake may be employed. Besides, the method of changing the yaw rate of the vehicle is not limited to the method of changing the steering angle by the EPS 10. A method of applying different brake hydraulic pressures to the right and left wheels of the host vehicle 20 respectively may be employed.

Figure 3:
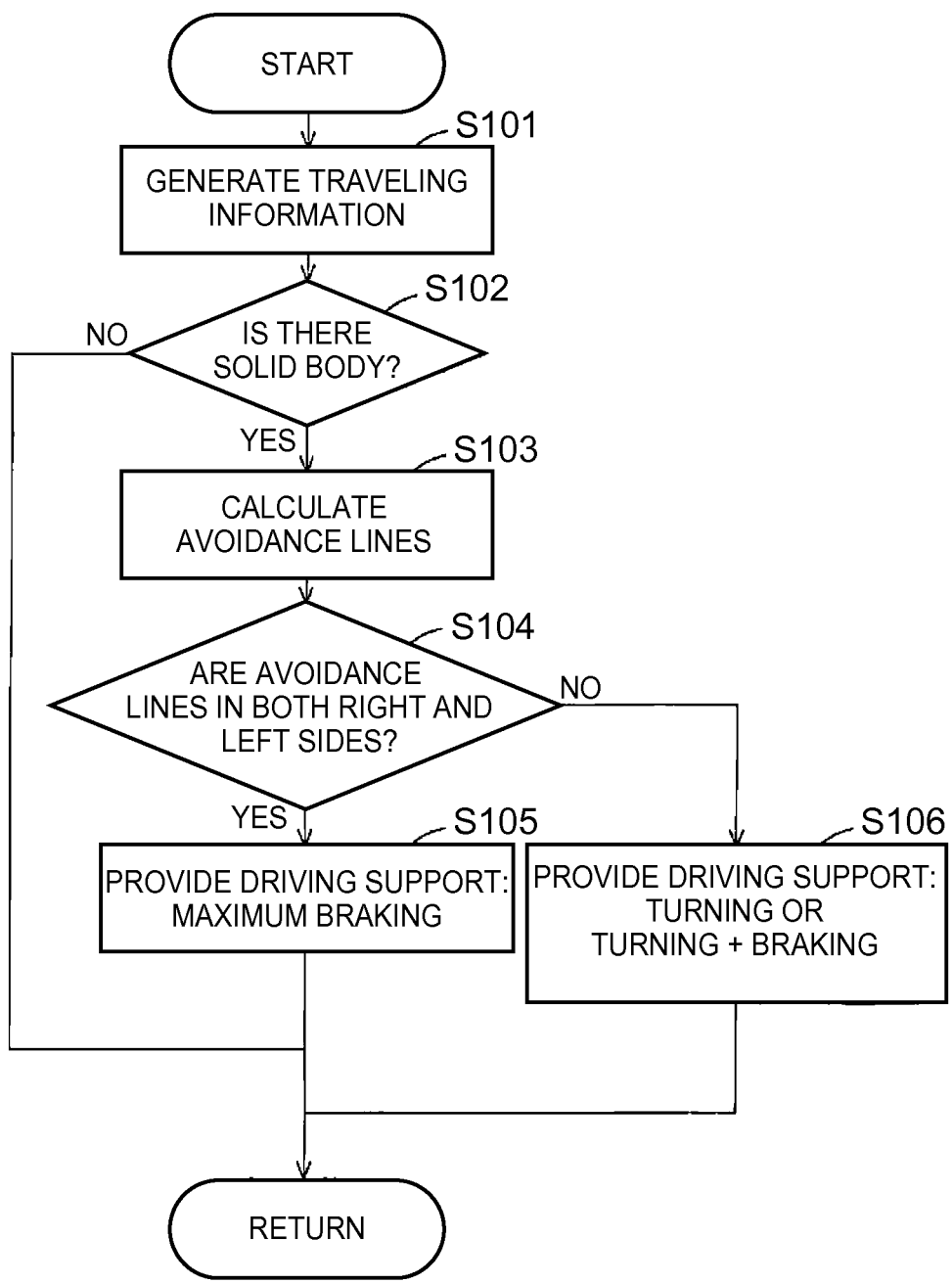
FIG. 3 is a flowchart of a driving support process that is performed in the vehicular driving support system shown in FIG. 1.

Next, a process for avoiding a collision by the driving support system according to this embodiment of the invention will be described on the basis of FIG. 3. The process shown in FIG. 3 is a process routine that is repeatedly executed by the ECU 1, and is stored in advance as a control program in a ROM or the like of the ECU 1. First of all in S101, information on a road on which the host vehicle 20 is to travel in the future is generated on the basis of an output signal of the outside world recognition device 2. That is, the ECU 1 generates information on position coordinates of indices indicating the solid body 30 that can be an obstacle of the host vehicle 20 and lane borders, and the posture of the host vehicle 20 with respect to the solid body 30 and the lane borders, in a coordinate system having an origin at which the host vehicle 20 is located. If the process of S101 ends, a transition to S102 is made. Subsequently in S102, the ECU 1 determines, on the basis of the information generated in the S101, whether or not the solid body 30 as an obstacle exists in the direction of a path of the host vehicle 20. The "path" mentioned herein is a route (e.g., the route a shown in FIG. 2) that is estimated to be followed by the host vehicle 20 in the case where the host vehicle 20 travels while maintaining the current lateral acceleration Gy0. If the solid body 30 exists on this estimated route, or if the solid body 30 exists within a certain distance from this route, it is determined that the solid body 30 exists in the advancing direction of the host vehicle 20. If the result of the determination in S102 is positive, a transition to S103 is made. If the result of the determination in S102 is negative, the ECU 1 temporarily ends the execution of the present routine. The processes according to the aforementioned S101 and the aforementioned S102 are equivalent to the process by the aforementioned traveling recognition unit 100.

Subsequently in S103, the lateral acceleration Gy0 of the host vehicle 20 at the moment is read via the acceleration sensor 5 by the aforementioned avoidance target trajectory acquisition unit 101, and the maximum change $\Delta Gy$ in the aforementioned lateral acceleration is added to or subtracted from the read lateral acceleration Gy0, whereby a traveling range in which the host vehicle 20 can travel is calculated, and a traveling trajectory that allows the interference of the traveling range with the solid body 30 to be avoided is calculated as an avoidance line. This avoidance line is equivalent to the avoidance target trajectory in the invention. If the process of S103 ends, a transition to S104 is made.

Figure 4A:
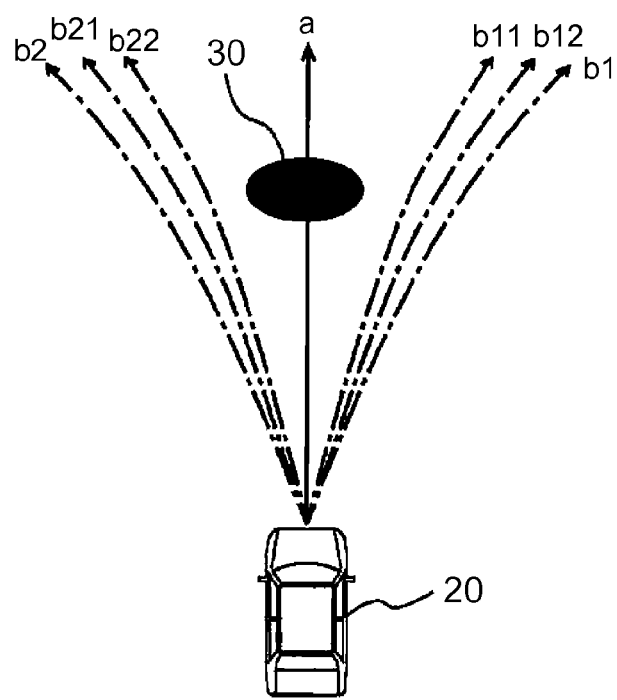
FIG. 4A is a first view showing avoidance target trajectories that can be followed by the vehicle to avoid a collision with a solid body that exists in an advancing direction.

In S104, the support control unit 102 determines whether or not there are avoidance lines that should be adopted to prevent the host vehicle 20 from colliding with the recognized solid body 30, on right and left sides of the solid body 30 in a right-to-left direction of the host vehicle 20. This determination is intended to determine whether or not there is at least one avoidance line on each of the right and left sides with respect to the solid body 30 in the right-to-left direction (width direction) of the host vehicle 20. Even in the case where there are a plurality of avoidance lines, if they exist only on one of the right and left sides with respect to the solid body 30 in a right-to-left direction of the host vehicle 20, the result of the determination in S104 is negative. For example, as shown in FIG. 4A, if the solid body 30 is located substantially on a path a of the host vehicle 20 and the width of the solid body 30 is relatively small, there are routes b11 and b12 in addition to the route b1 on the route b1 side that corresponds to the maximum change $+\Delta Gy0$ in the lateral acceleration, as avoidance lines, and furthermore, there are routes b21 and b22 in addition to the route b2 on the route b2 side that corresponds to the maximum change $-\Delta Gy$ in the lateral acceleration. Thus, in a state shown in FIG. 4A, the routes b1, b11 and b12 as avoidance lines exist on the right side of the host vehicle 20, and the routes b2, b21 and b22 as avoidance lines exist on the left side of the host vehicle 20. Accordingly, in such a state, there are avoidance lines in the right and left sides in the right-to-left direction of the host vehicle 20, and hence the result of the determination in S104 is positive.

Figure 4B:
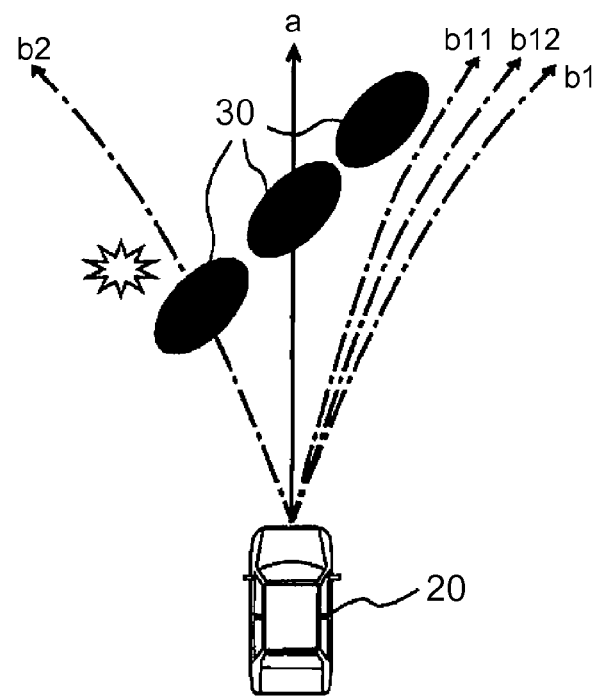
FIG. 4B is a second view showing avoidance target trajectories that can be followed by the vehicle to avoid a collision with a solid body that exists in the advancing direction.

Besides, as shown in FIG. 4B, if the solid bodies 30 are located on the path of the host vehicle 20, extend from the front-left side of the host vehicle 20 to the rear-right side of the host vehicle 20, and have a relatively long width, the routes b11 and b12 exist in addition to the route b1 on the route b1 side that corresponds to the maximum change $+\Delta Gy0$ in the lateral acceleration, as avoidance lines. However, there is no avoidance line on the route b2 side that corresponds to the maximum change $-\Delta Gy$ in the lateral acceleration. This is because of the following reason. Since the solid bodies 30 extend from the front-left side of the host vehicle 20 to the rear-right side of the host vehicle 20, the solid bodies 30 interfere on the route b2 even if the lateral acceleration changes by the maximum $\Delta Gy0$ in the minus direction and the host vehicle 20 travels on the route b2. In a case as shown in FIG. 4B, there are avoidance lines only in the right-side direction of the host vehicle 20 across the solid bodies 30, and therefore, the result of the determination in S104 is negative. Incidentally, even if the number of avoidance lines decreases and only the route b1 remains, or even if there are much more avoidance lines only on the right side of the host vehicle 20 with respect to the solid bodies 30, the result of the determination remains unchanged.

To sum up, if the result of the determination in S104 is positive in the present routine, a transition to S105 is made, and if the result of the determination in S104 is negative in the present routine, a transition to S106 is made. It should be noted herein that in S105, the support control unit 102 performs a driving support process for avoiding a collision of the host vehicle 20 with the solid body 30. This process will be concretely described on the basis of FIG. 4A. As described above, in the state shown in FIG. 4A, there are avoidance lines that should be adopted by the host vehicle 20, on the right and left sides of the solid body 30 in the right-to-left direction of the host vehicle 20. In other words, the host vehicle 20 can avoid a collision with the solid body 30 by making a right turn, and can avoid a collision with the solid body 30 by making a left turn as well. In such a case, if the support control unit 102 acts on the EPS 10 and attempts to make either a right turn or a left turn, the driver of the host vehicle 20 may steer to make a turn in the opposite direction. Then, the driver feels that a process unsuited for his or her feeling has been performed, because the driving support process of the support control unit 102 interferes with his or her steering.

Thus, in the driving support process in S105, the support control unit 102 decelerates the host vehicle 20 with a maximum braking force by the ECB 11, without changing the steering angle by the EPS 10 or turning the host vehicle 20 by applying different brake hydraulic pressures to the right and left wheels of the host vehicle 20 respectively. Incidentally, in this process, the support control unit 102 does not perform the control regarding the turning of the host vehicle 20, but the driver is guaranteed to steer on the basis of his or her judgment. In this manner, the driving support process is performed only during deceleration through the braking force, and the turning of the host vehicle 20 through steering is left up to the judgment of the driver, whereby the performance of the process unsuited for the feeling of the driver can be avoided. Incidentally, in order to enable turning through the driver's steering, it is preferable to generate a maximum braking force in a range that enables the generation of a lateral force that is more or less needed for the turning. However, if the host vehicle 20 can be sufficiently decelerated before colliding with the solid body 30, the braking force for decelerating the host vehicle 20 may be secured with higher priority than the lateral force for turning through the driver's steering. If the process of S105 ends, the present routine is repeated again from the beginning.

On the other hand, in S106 as well, the support control unit 102 performs the driving support process for avoiding a collision of the host vehicle 20 with the solid bodies 30. This process will be concretely described on the basis of FIG. 4B. As described above, in a state shown in FIG. 4B, there are avoidance lines that should be adopted by the host vehicle 20, only in the right direction of the host vehicle 20 with respect to the solid bodies 30. In other words, the host vehicle 20 can avoid a collision with the solid bodies 30 only by making a right turn. In the case where the turning direction of the host vehicle 20 is thus limited, the turning direction of the host vehicle 20 recognized by the driver and the turning direction of the host vehicle 20 recognized by the support control unit 102 coincide with each other. Thus, in such a case, the support control unit 102 turns the host vehicle 20 by changing the steering angle by the EPS 10 or applying different brake hydraulic pressures to the right and left wheels of the host vehicle 20 respectively, thereby performing the driving support process such that the host vehicle 20 travels on, for example, any one of the routes b1, b11 and b12 shown in FIG. 4B. Alternatively, in addition to this turning, deceleration is also carried out through a braking force by the ECB 11. If the process of S106 ends, the present routine is repeated again from the beginning.

According to the driving support process shown in FIG. 3, the contents of the process that is performed by the support control unit 102 are adjusted depending on whether or not there are avoidance lines that should be adopted by the host vehicle 20 in the case where the solid body 30 is recognized, on the right and left sides of the solid body 30 in the right-to-left direction of the host vehicle 20. As a result, a collision of the host vehicle 20 with the solid body 30 can be avoided while providing the driving support process suited for the feeling of the driver of the host vehicle 20. Incidentally, in the process shown in FIG. 3, the maximum change $\Delta Gy$ in the lateral acceleration that can be adopted by the host vehicle 20 is utilized in calculating an avoidance line in S103. In contrast, a predetermined restriction may be imposed on the change in lateral acceleration for calculating an avoidance line, in accordance with a predetermined object. For example, in order to allow the driver to override steering angle control while the support control unit 102 performs steering angle control for the EPS 10, an avoidance line may be calculated with the change in the lateral acceleration limited to about 0.2 G to 0.3 G In the case where the avoidance line in S103 is calculated under this marginal condition, as described above, even if the support control unit 102 performs control in such a manner as to turn the host vehicle 20, the driver can override the control through his or her own steering, and can turn the host vehicle 20 according to his or her own feeling.

⟨Second Embodiment⟩

Next, the second embodiment of a driving support process by the driving support system according to the invention will be described on the basis of FIGS. 5 to 7. Incidentally, since the processes S101 to S105 in the flowchart shown in FIG. 5 correspond to S101 to S105 of the driving support process shown in FIG. 3 respectively, detail description thereof is omitted. Incidentally, in this embodiment of the invention, in calculating an avoidance line in S103, a predetermined restriction is not taken into account in the maximum change $\Delta Gy$ in the lateral acceleration that can be adopted by the host vehicle 20.

Figure 5:
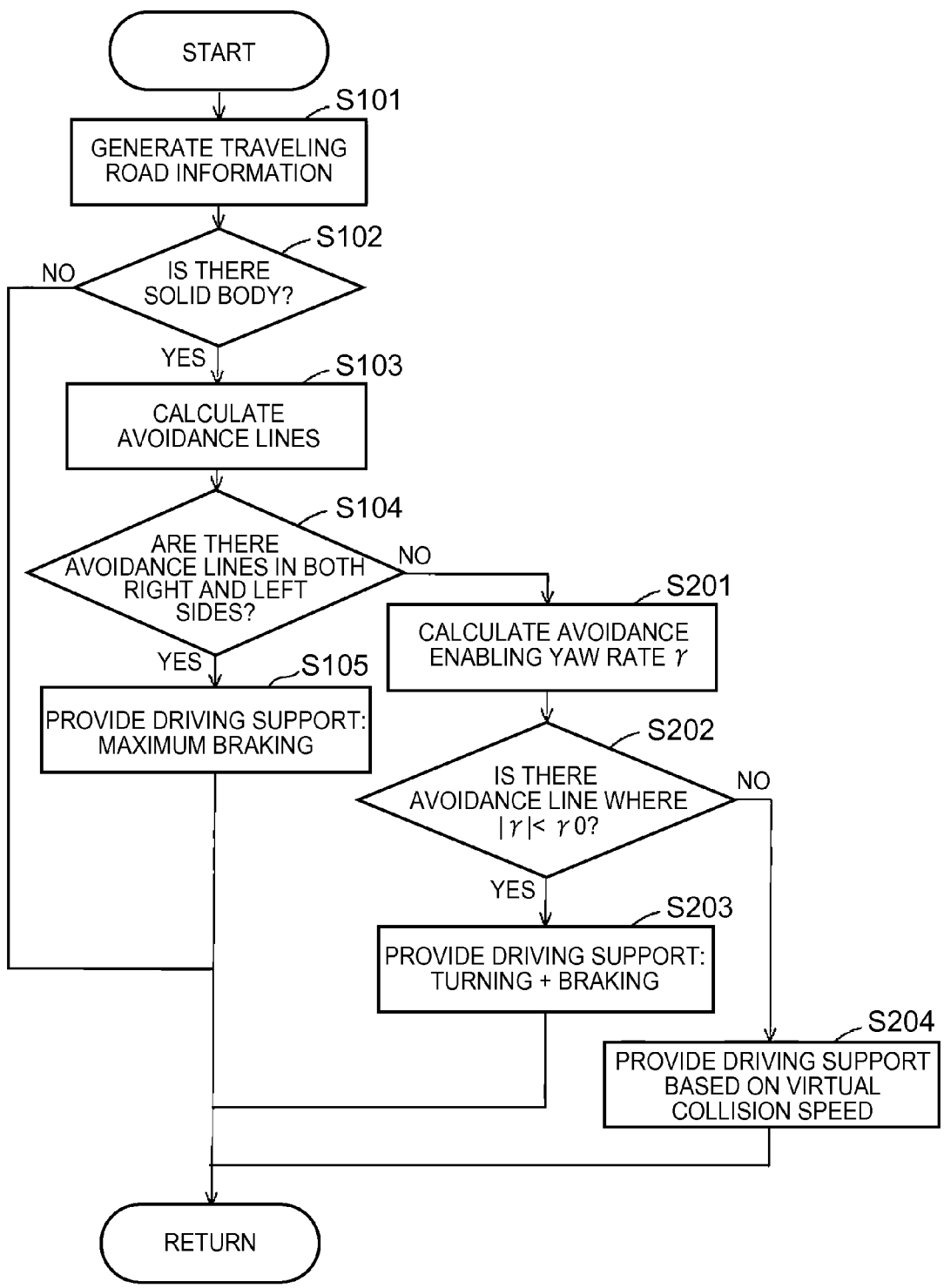
FIG. 5 is a flowchart of a second driving support process that is performed in the vehicular driving support system shown in FIG. 1.

It should be noted herein that in the driving support process shown in FIG. 5, if the support control unit 102 makes a negative determination on whether or not there are avoidance lines on the right and left sides of the solid body 30 in the right-to-left direction of the host vehicle 20, with respect to the recognized solid body 30, a transition to S201 is made. In S201, as for the avoidance line calculated in the aforementioned S103, an avoidance enabling yaw rate $\gamma$ as a yaw rate that is required for the host vehicle 20 to travel on the avoidance line is calculated. Specifically, the yaw rate $\gamma$ is utilized in calculating the avoidance line as described above. Therefore, this yaw rate is set as the avoidance enabling yaw rate $\gamma$ as to the avoidance line that does not interfere with the solid body 30. For example, in the state shown in FIG. 4B where there are avoidance lines only on the right side of the host vehicle 20 with respect to the solid bodies 30, avoidance enabling yaw rates $\gamma 1$, $\gamma 11$ and $\gamma 12$ are set for the avoidance lines b1, b11 and b12 respectively. These three values are correlated with one another such that $\gamma 1 > \gamma 12 > \gamma 11$, as is also apparent from the difference between turning radii of the host vehicle 20. If the process of S201 ends, a transition to S202 is made.

In S202, it is determined whether or not there is an avoidance line on which the absolute value $|\gamma|$ of the avoidance enabling yaw rate $\gamma$ calculated in S201 is equal to or smaller than a predetermined threshold $\gamma 0$. The threshold $\gamma 0$ is intended to set an upper limit of the absolute value of a lateral acceleration that is produced while the host vehicle 20 travels making a turn, in order to allow the driver to override steering control while the support control unit 102 performs the control for the EPS 10. For example, 0.2 G to 0.3 G can be adopted as the threshold $\gamma 0$. In other words, the determination in S202 is a process for selecting one or some from the calculated avoidance lines in such a manner as to prevent the lateral acceleration produced in the event of a collision of the host vehicle 20 with the solid body 30 from becoming excessively large to narrow the room of steering by the driver, although the collision can be avoided regardless of which ones of the avoidance lines calculated in S103 is selected. If the result of the determination in S202 is positive, a transition to S203 is made. If the result of the determination in S202 is negative, a transition to S204 is made.

It should be noted herein that in S203, the support control unit 102 performs the driving support process for avoiding a collision of the host vehicle 20 with the solid bodies 30. This process will be concretely described on the basis of FIG. 4B. As described above, in the state shown in FIG. 4B, there are avoidance lines that should be adopted by the host vehicle 20, only on the right side of the host vehicle 20 with respect to the solid bodies 30. Then, since the result of the determination in S202 is positive, there is an avoidance line on which the absolute value of the avoidance enabling yaw rate $\gamma$ is equal to or smaller than the predetermined threshold $\gamma 0$ (it is assumed in this embodiment of the invention that the avoidance line b11 satisfies the condition), among the calculated avoidance lines b1, b11 and b12. In such a case, as driving support by the support control unit 102, the support control unit 102 controls the steering angle by the EPS 10 or performs a process of applying different brake hydraulic pressures to the right and left wheels of the host vehicle 20 respectively, such that the host vehicle 20 travels making a turn on the avoidance line b11. Furthermore, in order to turn the host vehicle 20 and decelerate the host vehicle 20, the support control unit 102 commands the ECB 11 to exert a braking force. As a result, through the process of S203, the host vehicle 20 is decelerated while turning on a traveling line on which a collision of the host vehicle 20 with the solid bodies 30 can be avoided. If the process of S203 ends, the present routine is repeated again from the beginning.

On the other hand, if the result of the determination in S202 is negative, namely, if it is determined that the absolute value of the avoidance enabling yaw rate γ has exceeded the threshold γ0, the driving support process according to S204 is performed. A situation where the result of the determination in S202 is negative can be created in the case where a collision can be avoided on the avoidance lines b1 and b12 on which the absolute value of the avoidance enabling yaw rate γ exceeds the threshold γ0, but the host vehicle 20 collides with the solid body 30 on the avoidance line b11 on which the absolute value of the avoidance enabling yaw rate γ is equal to or smaller than the threshold γ0, as shown in FIG. 7. Thus, in S204, the support control unit 102 performs a process for driving support, which is assumed under a marginal condition on the turning of the host vehicle 20 that the absolute value of the avoidance enabling yaw rate γ be the threshold γ0 and is based on a virtual collision speed Vc of the host vehicle 20 with the solid body 30. This process will be described on the basis of a flowchart shown in FIG. 6 and FIG. 7.

As for the driving support process according to S204, first of all in S301, the turning condition of the host vehicle 20 is set as a marginal condition. Specifically, the host vehicle 20 is assumed to travel making a turn on an avoidance line on which the absolute value of the avoidance enabling yaw rate γ is equal to the threshold γ0 or closest to the threshold γ0, among the calculated avoidance lines, in order to calculate the later-described virtual collision speed Vc. In an example shown in FIG. 7, the host vehicle 20 is assumed to travel making a turn on the avoidance line b11. Then, under the assumption, in S302, the virtual collision speed Vc as a virtual collision speed in traveling making a turn on the avoidance line b11 is calculated. Specifically, a braking force that can be exerted substantially to the maximum possible extent in the host vehicle 20 is calculated on the basis of a lateral force that is needed when the host vehicle 20 travels on the avoidance line b11, and a frictional force between the host vehicle 20 and a traveling road surface, and the vehicle speed Vc in the event of a collision of the host vehicle 20 with the solid body 30 is calculated in consideration of deceleration corresponding to the braking force during the time of a collision to the solid body 30 on the avoidance line b11. If the process of S302 ends, a transition to S303 is made.

On the other hand, subsequently in S303, a virtual collision speed Vfb as a vehicle speed in the case where the host vehicle 20 is not caused to travel on the avoidance line calculated in S103 and is decelerated with a braking force that can be exerted substantially to the maximum possible extent in the host vehicle 20 with the advancing direction of the host vehicle 20 indicated as the route a maintained (in a non-turning state) is calculated. Specifically, a braking force that can be exerted substantially to the maximum possible extent in the host vehicle 20 is calculated on the basis of a lateral force (the lateral force is zero when the host vehicle travels straight) that is needed when the host vehicle 20 travels on the route a and a frictional force between the host vehicle 20 and a traveling road surface, and the vehicle speed Vfb in the case where the host vehicle 20 collides with the solid body 30 is calculated in consideration of deceleration corresponding to the braking force during the time of a collision to the solid body 30 on the route a. If the process of S303 ends, a transition to S304 is made.

In S304, the virtual collision speed Vc calculated in S302 and the virtual collision speed Vfb calculated in S303 are compared with each other, and it is determined whether or not the virtual collision speed Vc is lower than the virtual collision speed Vfb. If the result of the determination herein is positive, a transition to S305 is made. If the result of the determination herein is negative, a transition to S306 is made. The transition to S305 is made if the virtual collision speed Vc is lower than the virtual collision speed Vfb, which means that the speed of the host vehicle 20 in the event of a collision is lower when the host vehicle travels on the avoidance line b11 than when the host vehicle travels on the route a even in the case where the host vehicle 20 collides with the solid body 30. Thus, in S305, in order for the host vehicle to travel on the avoidance line b11 on which the vehicle speed in the event of a collision is low, the support control unit 102 performs the control of the steering angle by the EPS 10, or performs the process of applying different brake hydraulic pressures to the right and left wheels of the host vehicle 20 respectively. Furthermore, in order to decelerate the host vehicle 20 and turn the host vehicle 20, namely, exert a braking force that is assumed in calculating the virtual collision speed Vc in S302, the support control unit 102 issues a command to the ECB 11. If the process of S305 ends, the process of S204 shown in FIG. 5 ends, and the routine shown in FIG. 5 is repeated again.

On the other hand, the transition to S306 is made if the virtual collision speed Vfb is equal to or lower than the virtual collision speed Vc, which means that the speed of the host vehicle 20 in the event of a collision is lower when the host vehicle travels on the route a than when the host vehicle travels on the traveling line b11 even in the case where the host vehicle 20 collides with the solid body 30. Thus, in S305, in order for the host vehicle to continue to travel on the route a on which the vehicle speed in the event of a collision is low, the support control unit 102 issues a command to the ECB 11 so as to exert deceleration of the host vehicle 20, namely, the braking force that is assumed when the virtual collision speed Vfb is calculated in S303 while maintaining the steering angle by the EPS 10. If the process of S306 ends, the process of S204 shown in FIG. 5 ends, and the routine shown in FIG. 5 is repeated again.

Figure 6:
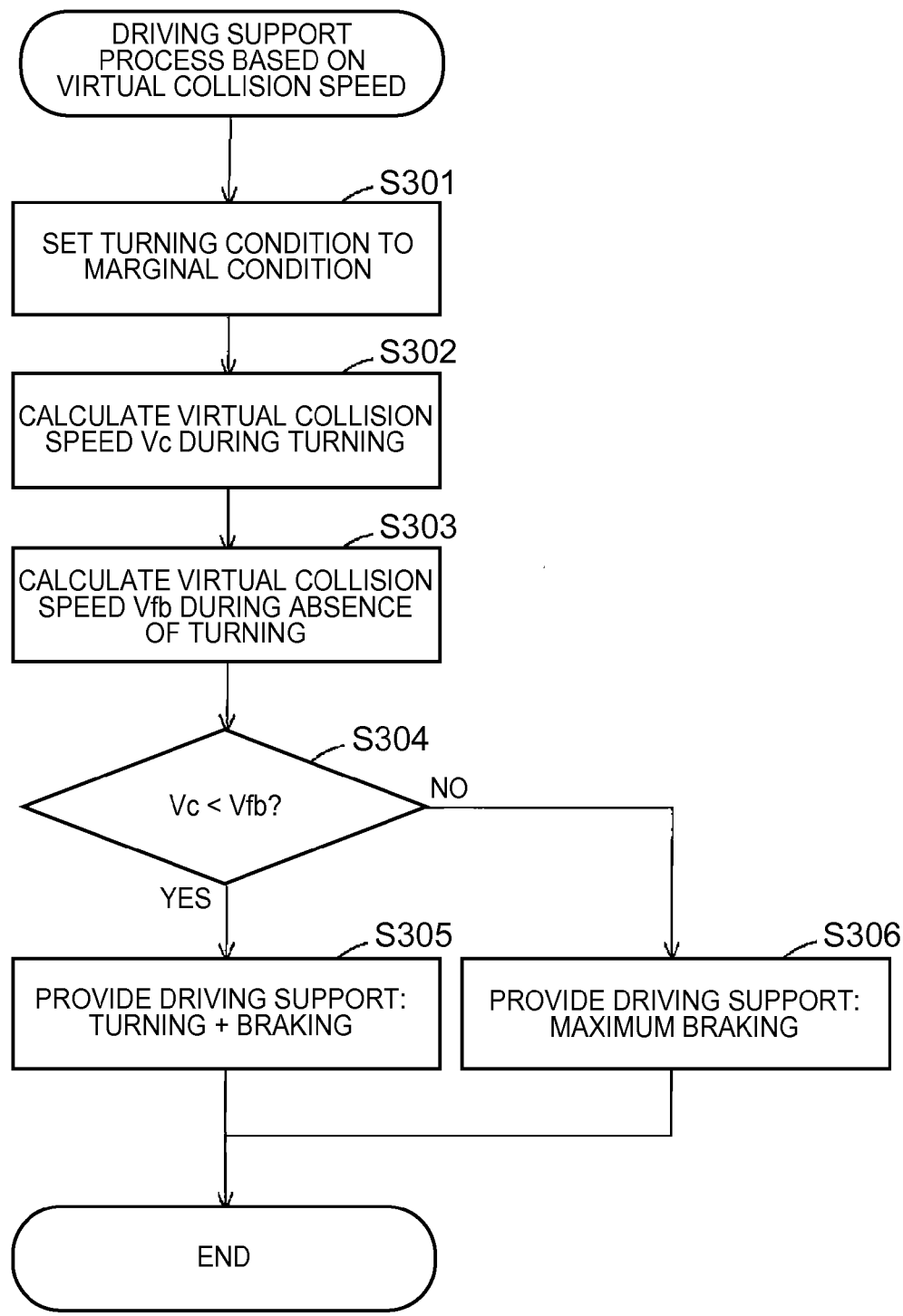
FIG. 6 is a flowchart of a process that is performed during the driving support process shown in FIG. 5 and is based on a virtual collision speed.
Figure 7:
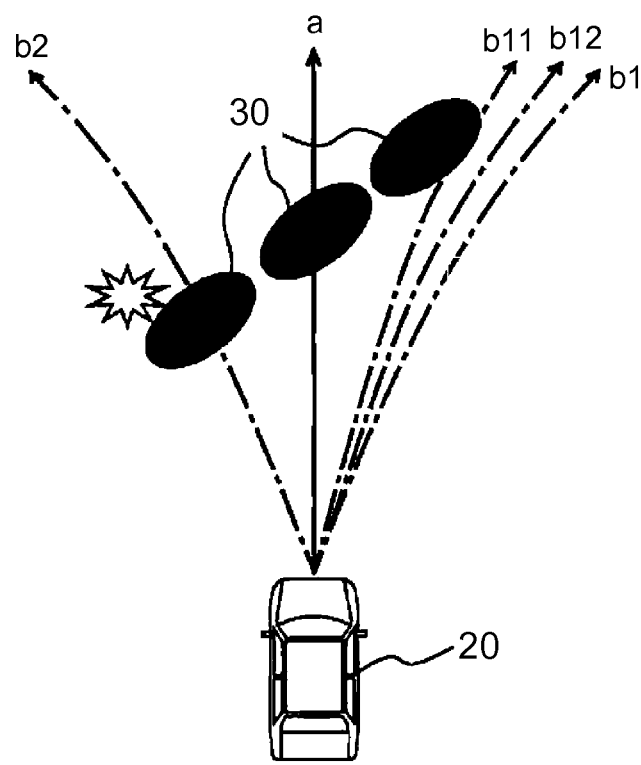
FIG. 7 is a third view showing avoidance target trajectories that can be followed by the vehicle to avoid a collision with a solid body that exists in the advancing direction.

According to the driving support process shown in FIGS. 5 and 6, the contents of the process that is performed by the support control unit 102 are adjusted depending on whether or not there are avoidance lines that should be adopted by the host vehicle 20 in the case where the solid body 30 is recognized, on the right and left sides of the solid body 30 in the right-to-left direction of the host vehicle 20. As a result, a collision of the host vehicle 20 with the solid body 30 can be avoided while providing the driving support process suited for the feeling of the driver of the host vehicle 20. Besides, even in the case where there is an avoidance line that should be adopted by the host vehicle 20 only on one of the right and left sides with respect to the solid body 30 in the right-to-left direction of the host vehicle 20, if the absolute value of the yaw rate γ during turning is equal to or smaller than the threshold γ0, a collision with the solid body 30 can be avoided in accordance with deceleration resulting from the turning and braking of the host vehicle 20 with the yaw rate during turning limited. As a result, a collision with the solid body 30 can be avoided with a room of the driver's steering left. Therefore, the driving support process suited for the feeling of the driver can be provided. Besides, even in the case where a collision of the host vehicle 20 with the solid body 30 cannot be avoided with the yaw rate during turning limited, the turning and braking of the host vehicle 20 are controlled such that the vehicle speed in the event of a collision becomes lower. As a result, the vehicle speed with respect to the solid body 30 in the event of a collision can be made as low as possible with a room for the driver's steering left. Therefore, the provision of the driving support process that mitigates a damage caused upon a collision to the utmost in accordance with the feeling of the driver is realized.

Incidentally, in the driving support processes shown in FIGS. 5 and 6, after the avoidance line is calculated in S103, a predetermined restriction on the avoidance enabling yaw rate according to the avoidance line is taken into account in S201 and S202. Instead, at the time of calculation in S103, an avoidance line may be calculated in consideration of the predetermined restriction. In such a case, the contents of the determination in S202 are changed to "whether or not there is an avoidance line on one of the right and left sides". If the result of the determination in S202 is positive, the process of S203 is performed. If the result of the determination in S202 is negative, the process of S204 is performed.

⟨Third Embodiment⟩

Next, the third embodiment of the driving support process by the driving support system according to the invention will be described on the basis of FIG. 8. Incidentally, since the processes S101 to S105 and S201 to S204 of the flowchart shown in FIG. 8 correspond to the processes S101 to S105 and S201 to S204 of the flowchart shown in FIG. 5 respectively, detailed description thereof is omitted. It should be noted herein that in the driving support process shown in FIG. 8, if the traveling road recognition unit 100 determines in S102 that the solid body 30 exists in the advancing direction of the host vehicle 20, a transition to S401 is made. In S401, if the host vehicle 20 starts decelerating through braking with the advancing direction thereof maintained, it is determined whether or not the host vehicle 20 can stop before colliding with the solid body 30 through the deceleration. A concrete description will be given on the basis of FIG. 4A. Under the assumption that the host vehicle 20 continues to travel on the route a, the determination in S401 is made in consideration of the distance to the solid body 30, the vehicle speed of the host vehicle 20, and the braking force that can be exerted. If the result of the determination herein is positive, a transition to S402 is made. If the result of the determination herein is negative, a transition to S103 is made.

In S402 as well as S105, the support control unit 102 carries out deceleration with the maximum braking force by the ECB 11, without turning the host vehicle 20 by changing the steering angle by the EPS 10 or applying different brake hydraulic pressures to the right and left wheels of the host vehicle 20 respectively. After the end of the process of S402, the present routine is repeated again. Besides, after a negative determination is made in S401, a transition to S103 is made. However, since the processes starting from S103 have already been described, the description thereof is omitted.

Figure 8:
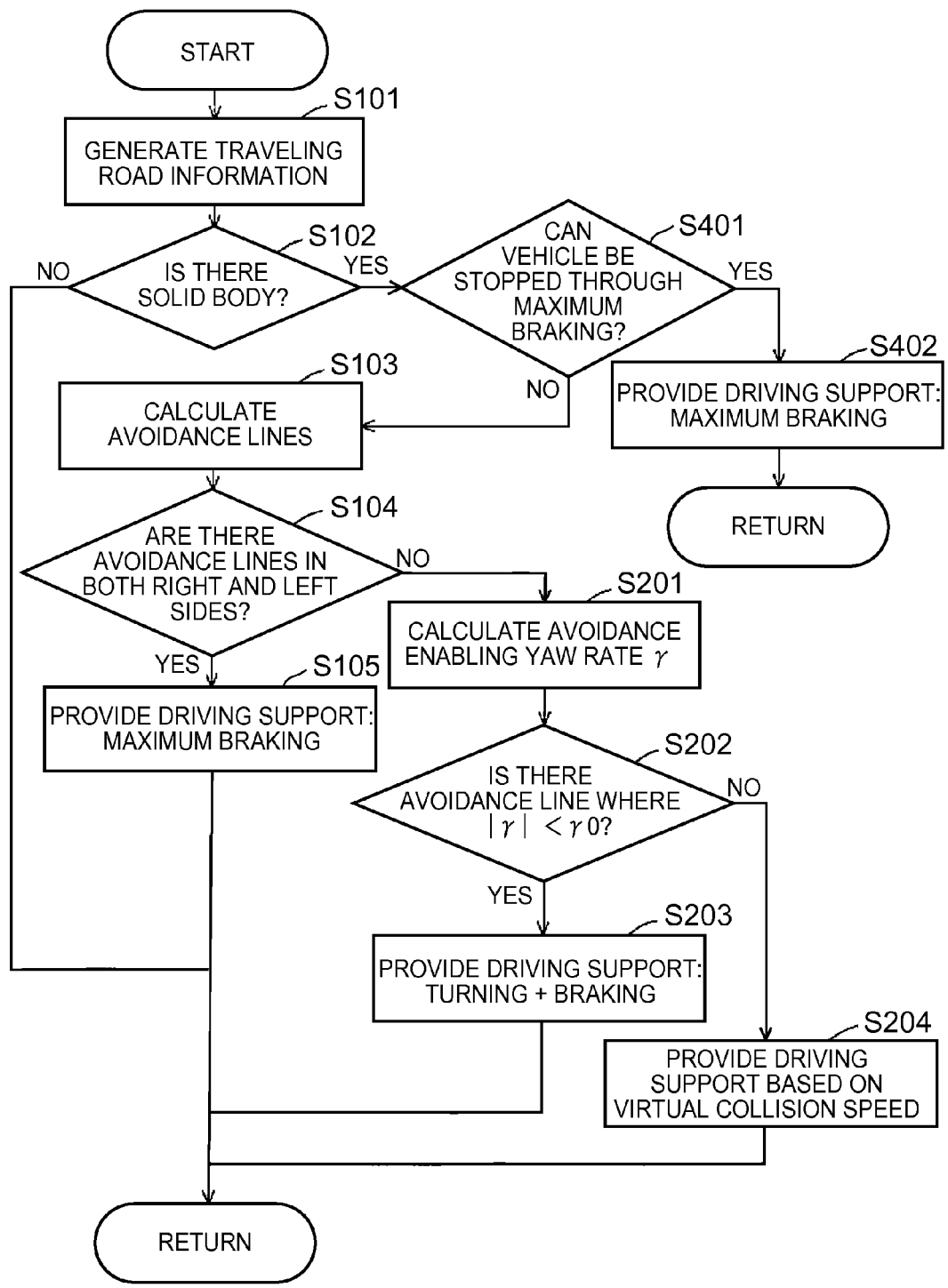
FIG. 8 is a flowchart of a third driving support process that is performed in the vehicular driving support system shown in FIG. 1.

According to the driving support process shown in FIG. 8, if the existence of the solid body 30 is recognized and the host vehicle can be stopped by a braking force, deceleration is immediately carried out with a maximum braking force without calculating an avoidance line. As a result, the driving support process for avoiding a collision with the solid body 30 can be performed as swiftly as possible, and a collision can be more reliably avoided.

DESCRIPTION OF REFERENCE NUMERALS

1 ECU
2 OUTSIDE WORLD RECOGNITION DEVICE
3 YAW RATE SENSOR
4 WHEEL SPEED SENSORS
5 ACCELERATION SENSOR
6 BRAKE SENSOR
7 ACCELERATOR SENSOR
8 STEERING ANGLE SENSOR
9 STEERING TORQUE SENSOR
10 ELECTRIC POWER STEERING (EPS)
11 ELECTRONICALLY CONTROLLED BRAKE (ECB)
20 HOST VEHICLE
30 SOLID BODY
100 TRAVELING ROAD RECOGNITION UNIT
101 AVOIDANCE TARGET TRAJECTORY ACQUISITION UNIT
102 SUPPORT CONTROL UNIT

The invention claimed is:

1. A vehicular driving support system comprising:
a recognition unit that recognizes a solid body that exists in an advancing direction of a host vehicle;
an acquisition unit that acquires at least one avoidance target trajectory that allows a collision of the host vehicle with the solid body to be avoided, on a basis of a traveling state of the host vehicle, if the recognition unit recognizes an existence of the solid body; and
a support control unit that performs support control for avoiding a collision of the host vehicle with the solid body on a basis of the avoidance target trajectory acquired by the acquisition unit, wherein
the support control unit performs control regarding braking of the host vehicle without performing control regarding turning of the host vehicle if the avoidance target trajectories acquired by the acquisition unit exist on right and left sides of the solid body in a right-to-left direction of the host vehicle.

2. The vehicular driving support system according to claim 1, wherein the support control unit is permitted to perform control regarding turning of the host vehicle, and an amount of turning of the host vehicle by the support control unit is limited so as not to exceed a predetermined turning amount that is set on a basis of a turning amount that can be generated through a driver's steering, if the avoidance target trajectory acquired by the acquisition unit exist on one of the right and left sides of the solid body in the right-to-left direction of the host vehicle.

3. The vehicular driving support system according to claim 2, further comprising a determination unit that determines whether or not a collision of the host vehicle with the solid body can be avoided in a limited state where the amount of turning of the host vehicle by the support control unit is limited so as not to exceed the predetermined turning amount, wherein
the support control unit determines whether to permit control regarding turning of the host vehicle by the support control unit or not, on a basis of a virtual collision speed of the host vehicle, in a case where the host vehicle collides with the solid body while the support control unit performs control regarding turning and control regarding braking, under the limited state, if the determination unit determines that a collision of the host vehicle with the solid body cannot be avoided.

4. The vehicular driving support system according to claim 3, wherein the support control unit calculates a second virtual collision speed in a case where the host vehicle collides with the solid body while being controlled such that a maximum braking force is generated as to braking thereof without being controlled as to turning thereof by the support control unit, and performs control regarding braking of the host vehicle as well as control regarding turning of the host vehicle, if the virtual collision speed is lower than the second virtual collision speed.

5. The vehicular driving support system according to claim 3, wherein the support control unit calculates a second virtual collision speed in a case where the host vehicle collides with the solid body while being controlled such that a maximum braking force is generated as to braking thereof without being controlled as to turning thereof by the support control unit, and performs only control regarding braking of the host vehicle without performing control regarding turning of the host vehicle, if the virtual collision speed is not lower than the second virtual collision speed.

6. The vehicular driving support system according to claim 2, further comprising a determination unit that determines whether or not a collision of the host vehicle with the solid body can be avoided in a limited state where the amount of turning of the host vehicle by the support control unit is limited so as not to exceed the predetermined turning amount, wherein the support control unit performs control regarding braking of the host vehicle as well as control regarding turning of the host vehicle, if the determination unit determines that a collision of the host vehicle with the solid body can be avoided.

\* \* \* \* \*